June 21, 1938.  E. W. WRIGHT  2,121,722
COTTON CLEANER
Filed May 10, 1937  2 Sheets-Sheet 1

Elam W. Wright, INVENTOR
BY Victor J. Evans & Co.
ATTORNEYS

June 21, 1938.  E. W. WRIGHT  2,121,722
COTTON CLEANER
Filed May 10, 1937  2 Sheets-Sheet 2

Elam W. Wright, INVENTOR
BY Victor J. Evans & Co.
ATTORNEYS

Patented June 21, 1938

2,121,722

UNITED STATES PATENT OFFICE 2,121,722

COTTON CLEANER

Elam W. Wright, Abilene, Tex., assignor of forty per cent to Hattie Miller and ten per cent to J. W. Reid, both of Abilene, Tex.

Application May 10, 1937, Serial No. 141,783

2 Claims. (Cl. 19—37)

This invention relates to cotton cleaners and has for an object to provide a plurality of cleaner units which operate successively upon the cotton to be cleaned, the device being so constructed that the hulls with cotton clinging thereto are conveyed across the first saw cylinder toward the right side of the machine and thence conveyed toward the left side of the machine across the second saw cylinder and subsequently conveyed again toward the right side of the machine across the third saw cylinder so that during progress through the three cleaning stages all of the cotton will be removed from the hulls and thus considerable cotton will be saved that has hitherto been wasted.

A further object of the invention is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1:
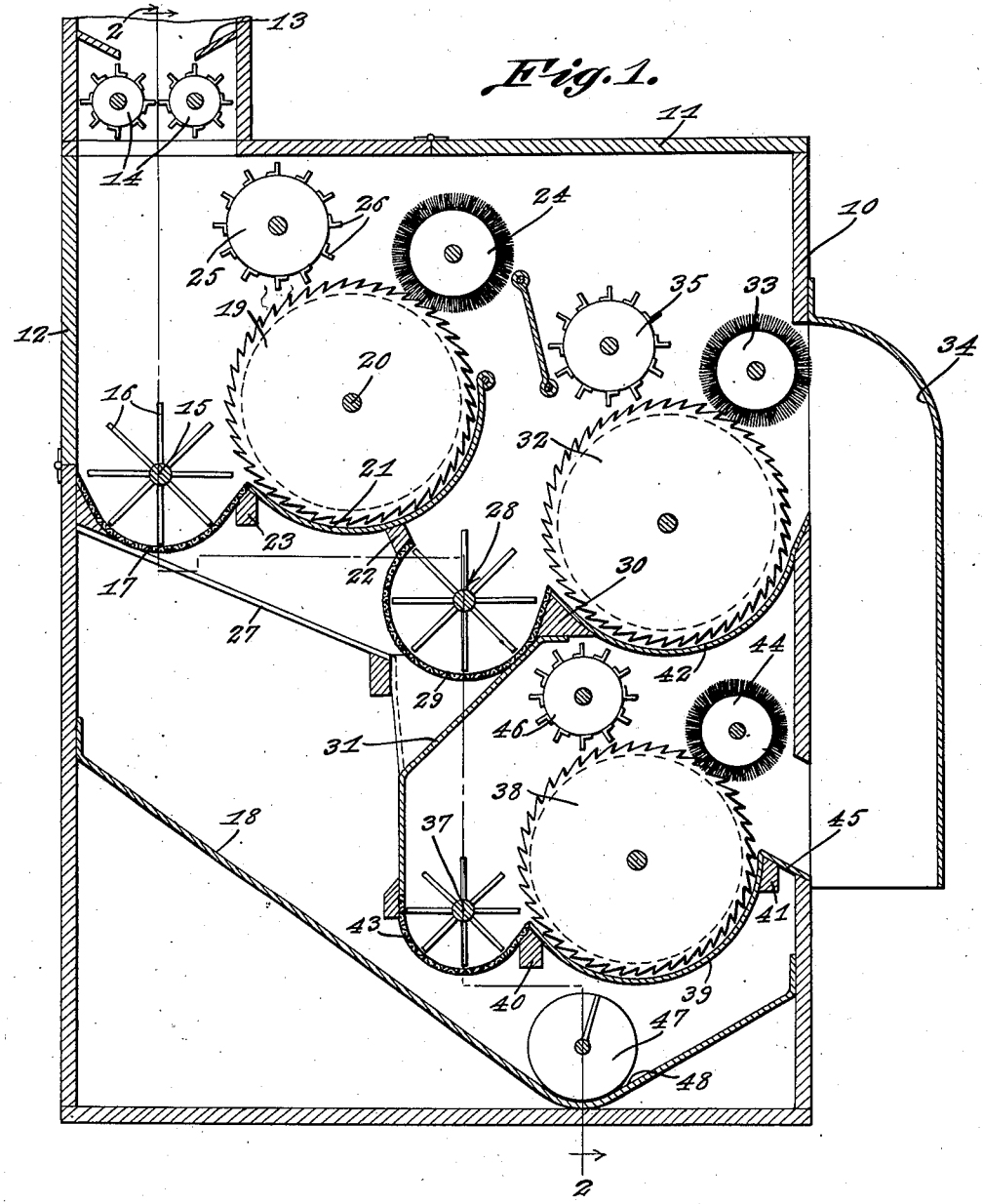
Figure 1 is a longitudinal sectional view of a cotton cleaner constructed in accordance with the invention.

Referring now to the drawings in which like characters of reference designate similar parts in the various views, 10 designates a housing having a top hinged door 11 and a rear hinged door 12 through which access may be had to the interior of the housing. A hopper 13 is mounted on the housing and is equipped with feed rollers 14 which feed the cotton to the conveyor of the first cleaning unit.

The conveyor of the first cleaning unit comprises a shaft 15 which is journaled in the sides of the casing and is equipped with spirally arranged spikes 16. A screen 17 extends underneath the conveyor and dirt and trash may drop through the screen on to a chute 18 which is disposed directly below the screen and extends from side to side of the casing.

A saw cylinder 19 is mounted on a shaft 20 which is journaled in the sides of the casing. Underneath the saw cylinder an arcuate sheet metal plate 21 is supported upon transversely disposed bars 22 and 23 and this plate separates the first cleaning unit from the second cleaning unit later to be described.

Figure 2:
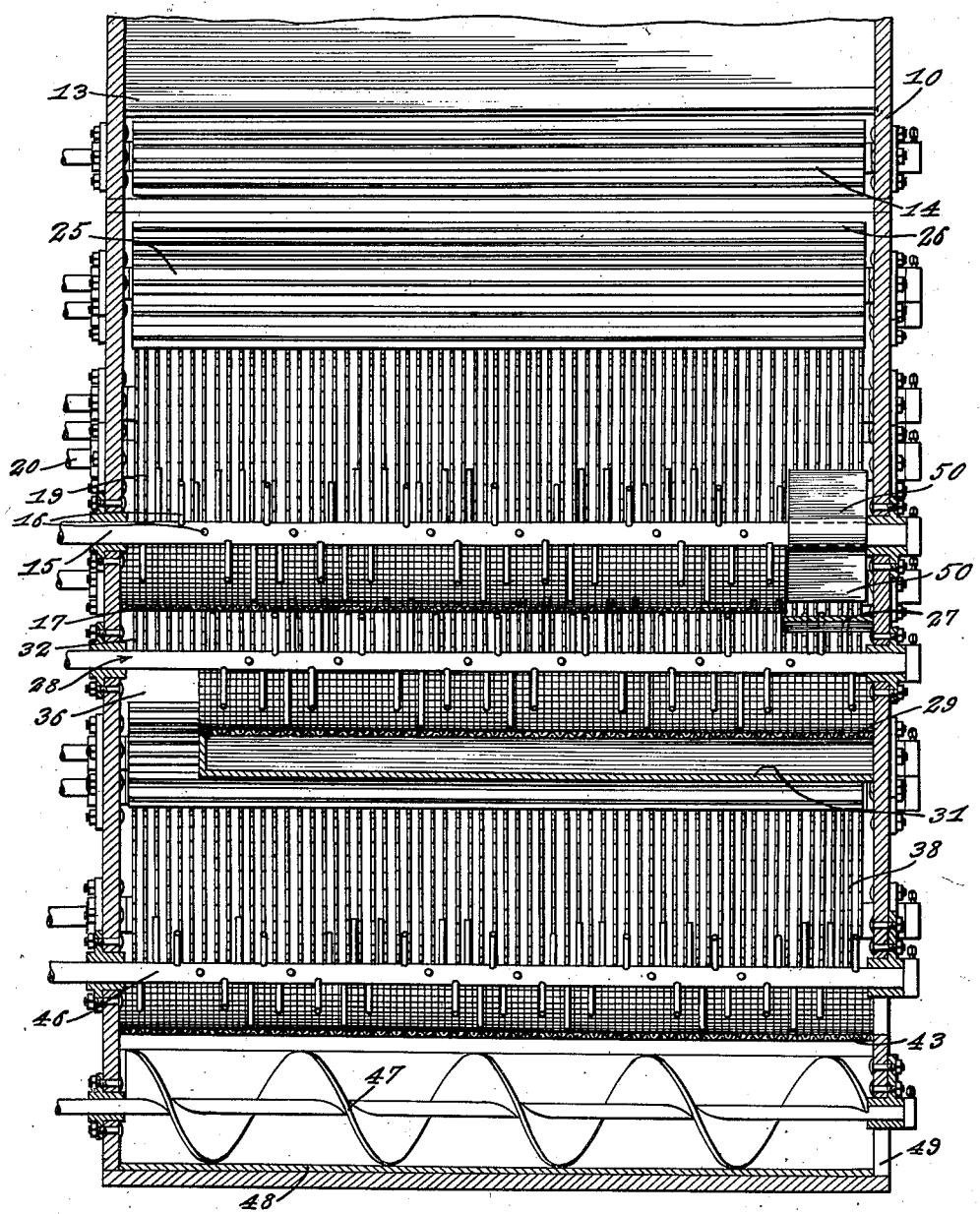
Figure 2 is a cross sectional view taken on the line 2—2 of Figure 1.

The spiked conveyor 15 conveys the cotton with hulls sticking thereto across the saw cylinder from left to right of the housing. The saw cylinder dislodges most of the cotton from the hulls and carries cotton and hully cotton in this condition toward the discharge side of the saw cylinder where a revolving brush 24 removes clean cotton from the saw cylinder for delivery from the machine. A breaker roller 25 having ribs 26 is disposed in advance of the brush and throws the hully cotton back into the conveyor. The hully cotton is discharged from the first spiked conveyor 15 onto an inclined chute 27 arranged on the right side of the machine, as best shown in Figure 2 and this chute delivers the cotton with hulls sticking thereto to the right end of the spiked conveyor 28 of the second cleaning unit. The spiked conveyor is provided with a screen bottom 29 which is supported by the beforementioned transversely disposed bar 22 and a second transversely disposed bar 30. Chaff and dirt may drop through this bottom onto a chute 31 which delivers the same onto the beforementioned chute 18 for removal from the machine.

Cotton with hulls sticking thereto is moved by the conveyor 28 from right to left of the machine across a saw cylinder 32 which frees some of the cotton and carries it to the rotating brush 33 of the second cleaning unit for delivery from the machine through a spout 34.

A breaker roller 35 similar to the breaker roller 25 of the first cleaning unit throws hulls with cotton clinging thereto back into the conveyor 28 for further conditioning. The spiked conveyor 28 discharges hulls with cotton clinging thereto through an open space designated by the numeral 36 in Figure 2 at the left side of the machine, such material gravitating onto the initial end of the spiked conveyor 37 of the third cleaning unit.

The spiked conveyor 37 transfers the material from left to right of the machine across the face of the saw cylinder 38 of the third cleaning unit. An arcuate sheet metal plate 39 is supported upon transversely disposed bars 40 and 41 in the casing. A similar sheet metal plate 42 is supported upon the beforementioned transversely disposed bar 30 and a wall of the casing is underneath the saw cylinder 32 of the second cleaning unit. The plates 39 and 42 respectively form the bottom and top of the third cleaning unit.

Hulls conveyed across screen bottom 43 of the spiked conveyor 37 are discharged at right end of machine. The saw cylinder 38 extracts all of the cotton that may be clinging to hulls at this stage and the cotton is removed from the saw by the rotating brush 44 for discharge onto a chute 45 which discharges into the chute 34. A ribbed breaker roller 46 breaks up whatever hulls may be still clinging to the cotton on the face of the saw cylinder and propels the same off of the saw cylinder into the spiked conveyor 37 for further treatment by the saw cylinder. A worm conveyor 47 is disposed in a trough 48 at the bottom of the chute 18 and conveys dirt, chaff, and dust to the discharge opening 49 of the housing, as best shown in Figure 2.

By referring now to Figure 2 it will be seen that the shaft 15 of the initial spiked conveyor is provided with a pair of blades 50 which are substantially the same in width as the beforementioned chute 27. These blades eject the hully cotton from the delivery end of the first spiked conveyor to the intake end of the second spiked conveyor 28.

Since the operation of the device has been described as the description of the parts progressed it is thought that the construction and operation of the invention will be fully understood without further explanation.

What is claimed is:

1. A cotton cleaner comprising a plurality of cleaner units adapted to operate successively upon hully cotton, a housing for the units; each unit including a saw cylinder, a cotton removing rotary brush engaging the cylinder, a spiked shaft and trough forming a conveyor for conveying hully cotton longitudinally of the cylinder, a knocker roller disposed between the conveyor and the brush, and blades on said spiked shaft for ejecting hully cotton from the discharge end of one conveyor into the intake end of the next succeeding conveyor for recleaning the cotton; means for directing cleaned cotton from each unit, and means for directing hulls discharged from each conveyor unit in a unit mass out of the housing.

2. A cotton cleaner comprising a casing, a plurality of cleaner units arranged at different levels in the casing adapted to act successively upon hully cotton, conveyors for conveying hully cotton longitudinally of the first cleaner unit in one direction and longitudinally of the next succeeding lower cleaner unit in a counter direction to promote travel of hully cotton in a circuitous path from side to side of the casing, partitions in the casing separating each unit from the next succeeding unit, each unit comprising a saw cylinder, a spiked shaft extending longitudinally of each conveyor, blades on the shaft for ejecting hully cotton from one conveyor to the next succeeding conveyor, a knocker roller disposed above the conveyor and extending longitudinally of the cylinder and a rotary brush engaging the cylinder and disposed on the opposite side of the knocker roller from the conveyor.

ELAM W. WRIGHT.